United States Patent
Krishnamoorthy (10) Patent No.: US 7,054,923 B2
(45) Date of Patent: May 30, 2006

(54) ACCESS CONTROL REPOSITORY FOR PROVIDING ACCESS CONTROL OF SERVICE PROFILES FOR WEB BASED SOLUTIONS

(75) Inventor: Satheesh Kumar Krishnamoorthy, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 748 days.

(21) Appl. No.: 10/017,019

(22) Filed: Dec. 14, 2001

(65) Prior Publication Data

US 2003/0115201 A1   Jun. 19, 2003

(51) Int. Cl.
    G06F 15/16   (2006.01)
(52) U.S. Cl. .......................... 709/219; 707/10
(58) Field of Classification Search ................ 709/225, 709/229, 217, 219; 707/9, 10, 3
    See application file for complete search history.

(56) References Cited

U.S. PATENT DOCUMENTS 6,134,548 A * 10/2000 Gottsman et al. ............. 707/5
6,308,203 B1 * 10/2001 Itabashi et al. ............. 709/217
6,327,363 B1 * 12/2001 Henderson et al. ..... 379/265.01
6,381,587 B1 *  4/2002 Guzelsu ..................... 705/40
6,526,438 B1 *  2/2003 Bienvenu et al. ........... 709/219
6,535,917 B1 *  3/2003 Zamanzadeh et al. ...... 709/225
6,542,601 B1 *  4/2003 Hernandez et al. .... 379/265.01
6,587,836 B1 *  7/2003 Ahlberg et al. .............. 705/26
6,654,745 B1 * 11/2003 Feldman ...................... 707/9
6,748,426 B1 *  6/2004 Shaffer et al. ............. 709/219
6,778,991 B1 *  8/2004 Tenorio ...................... 707/10
6,782,425 B1 *  8/2004 Germscheid et al. ....... 709/227

* cited by examiner

Primary Examiner—Marc D. Thompson
(74) Attorney, Agent, or Firm—Patterson & Sheridan, LLP (57) ABSTRACT

Method, apparatus and article of manufacture for implementing a common entitlement service through an access control repository. The access control repository is interposed between a front-end environment (i.e., a plurality of clients) and back-end resources containing a plurality of entitlement databases. During a browsing session, clients may invoke a plurality of applications each of which are configured to support different Web based solutions. To determine a customer's entitlement to a particular solution, the applications access a common repository containing entitlement information. Illustratively, the common repository is populated with entitlement information from a plurality of diversified entitlement systems.

29 Claims, 10 Drawing Sheets

| USER ID | ASSET ID | SERVICE ID | SUBSERVICE ID (ACCESS LEVEL) | COUNTRY CODE | APPLICATION ID |
|---|---|---|---|---|---|
| JOESMITH | 5769xz1 | 1000 | 1 | 000 | eSERVICE |
| *ALL | --- | 9999 | --- | 867 | --- |

Fig. 10

ACCESS CONTROL REPOSITORY FOR PROVIDING ACCESS CONTROL OF SERVICE PROFILES FOR WEB BASED SOLUTIONS

BACKGROUND OF THE INVENTION

1. Field of the Invention

The present invention generally relates to data processing. More particularly, the invention relates to providing entitlement services data.

2. Description of the Related Art

It is well known to couple a plurality of computer systems into a network of computer systems. In this way, the collective resources available within the network may be shared amongst users, thus allowing each connected user to enjoy resources which would not be economically feasible to provide to each user individually. With the growth of the Internet, sharing of computer resources has been brought to a much wider audience. The Internet has become a cultural medium in today's society for both information and entertainment. For many companies, one or more Internet sites are an integral part of their business; these sites are frequently mentioned in the companies' television, radio and print advertising.

Despite their usefulness, wide area networks such as the Internet present integration problems for many enterprises. Such problems arise, for example, with corporations providing entitlement services to customers. In general, entitlement services include maintenance agreements, service agreements and the like. Such agreements may attach to any of a variety of products offered by the corporation, including hardware and software. In an effort to make this information available to customers corporations typically provide Web based access to entitlement services databases. However, in today's large distributed corporate environment, the entitlement services data as well as the applications providing access thereto tend to be highly diversified. This diversification arises because the business rules underlying the entitlement services vary according to product and geography. In order to facilitate an expeditious Web based solution for customers, developers focus on a particular entitlement service rather than on a holistic (e.g., global) strategy. As a result, a single customer having made a plurality of purchases in different global regions (e.g., different countries) may be in a position of having to access a multiplicity of web applications in order to access the entitlement services data for each of the products purchased. Even when accessing different entitlement services for the same product (e.g., such as where the customer has entitlement services for a particular type of computer in the United States as well as in the United Kingdom), the user may be required to perform a separate registration step in order to access the entitlement services for each country.

Figure 1:
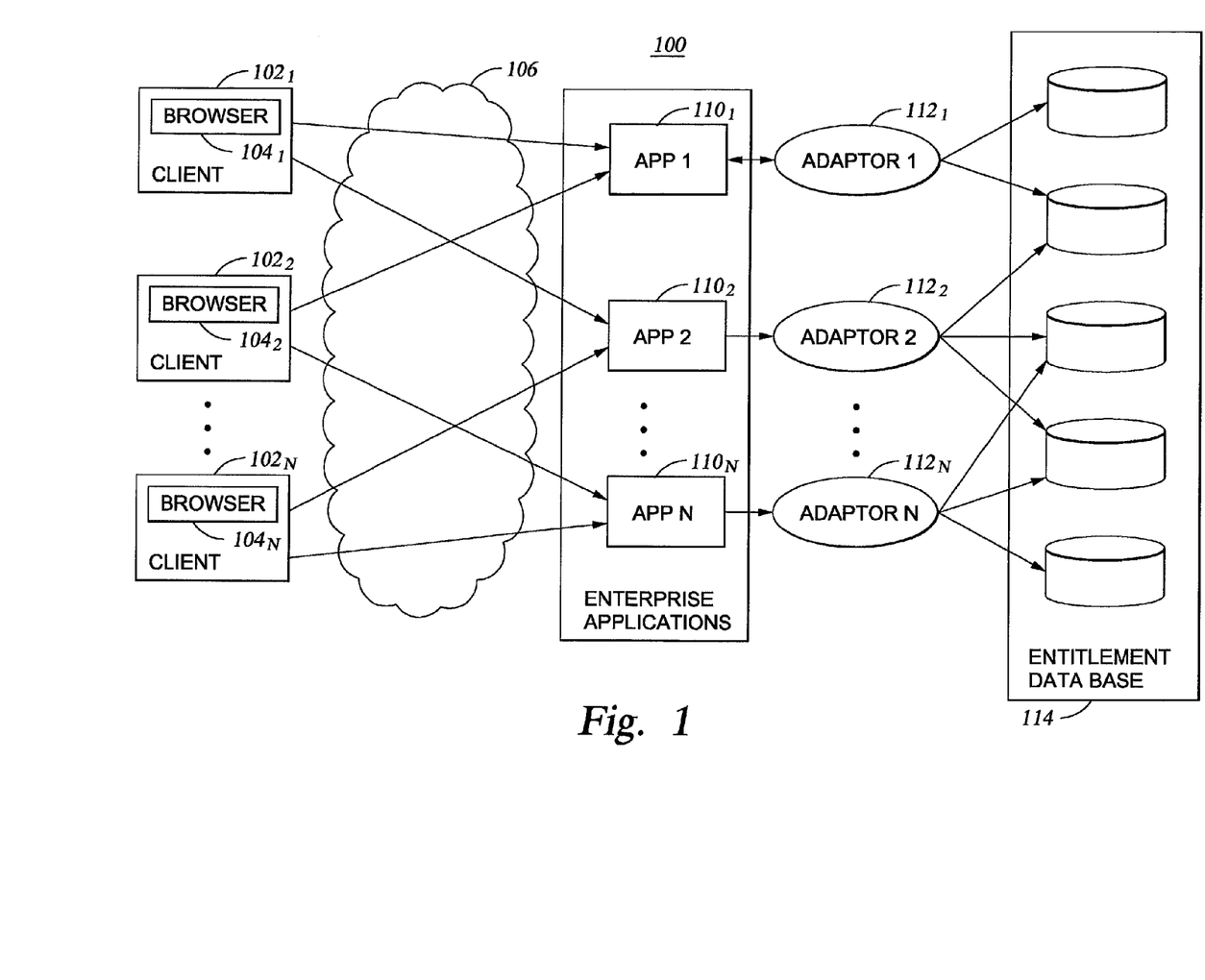
FIG. 1 is a prior art data processing environment supporting Web based entitlement services.

The foregoing problems may be illustrated with reference to the network environment 100 of FIG. 1. In general, the network environment 100 shows a plurality of client computers 102$_1$, 102$_2$ . . . 102$_N$ (collectively referred to herein as clients 102) operated by users desiring to access entitlement services databases 114. In a Web-based environment each of the clients 102 execute a browser application 104. During a browser session, a user may ultimately invoke an enterprise application 110$_1$, 110$_2$ . . . 110$_N$ (collectively referred to herein as applications 110), such as by clicking on a hyperlink. Each application 110 is configured to access a limited number of the entitlement databases 114 via an adapter 112$_1$, 112$_2$ . . . 112$_N$ (collectively referred to herein as adapters 112).

Accordingly, no common entitlement system exists. Instead, a plurality of applications 110 were (and continue to be) independently developed to support different products and hence, different entitlement services. Each of the applications 110 define their own entitlement interfaces and provide no connectivity (e.g., data sharing) between one another. The lack of connectivity between applications results in each application having to separately access the entitlement databases 114 for a given customer during a given browser session. In addition, each application is configured to access its own limited number of entitlement databases, resulting in duplication of efforts and resources. Such an environment provides an undesirable interface for customers and substantially complicates development.

Further, it is often desirable for an enterprise to extend complementary services to its customers. However, where the entitlement services data is distributed over a plurality of databases, no feasible solution for extending such complementary services exists. This is because each application is configured to access only selected databases containing information specific to the services supported by the accessing application. As a result, any given application has no knowledge about entitlement services data contained in another databases serviced by other applications.

Therefore, there is a need for a method and a system for overcoming the problems associated with existing entitlement services systems.

SUMMARY OF THE INVENTION

The present invention provides an access control repository for implementing a common entitlement service. The following summaries provide illustrative embodiment and are not intended to define all embodiments within the scope of the invention nor to limit the scope of the invention.

One embodiment provides a method of providing entitlement services information to users comprising receiving a request for entitlement services information for a particular user; and in response to receiving the request, accessing a common entitlement services information repository. The common entitlement services information repository associates entitlement services with products to which the entitlement services attach and with users of the products. In one embodiment each of at least a portion of the plurality of users is associated with at least two products.

Another embodiment provides an entitlement services system comprising a common entitlement services information system comprising a repository associating entitlement services with products to which the entitlement services attach and with users of the products; wherein each of at least a portion of the plurality of users is associated with at least two products.

Still another embodiment provides an entitlement services system, comprising a common entitlement services information system, comprising a repository and an access control software component configured to access the repository in response to entitlement services information requests. The repository associates entitlement services with products to which the entitlement services attach and with users of the products. In one embodiment each of at least a portion of the plurality of users is associated with at least two products. The entitlement services system further comprises at least one server executing a plurality of Web based applications configured to issue the entitlement services information requests and a web server hosting a Web service providing an interface to each of the plurality of applications.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention provides an access control repository for implementing a common entitlement service. The access control repository is interposed between a front-end environment (i.e., a plurality of clients) and back-end resources containing a plurality of entitlement databases. During a browsing session, clients may invoke a plurality of applications each of which are configured to support different Web based solutions. To determine a customer's entitlement to a particular solution, the applications access a common repository containing entitlement information. Illustratively, the common repository is populated with entitlement information from a plurality of diversified entitlement systems.

One embodiment of the invention is implemented as a program product for use with a computer system such as, for example, the computer 200 shown in FIG. 2 and described below. The program(s) of the program product defines functions of the embodiments (including the methods described below) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 2:
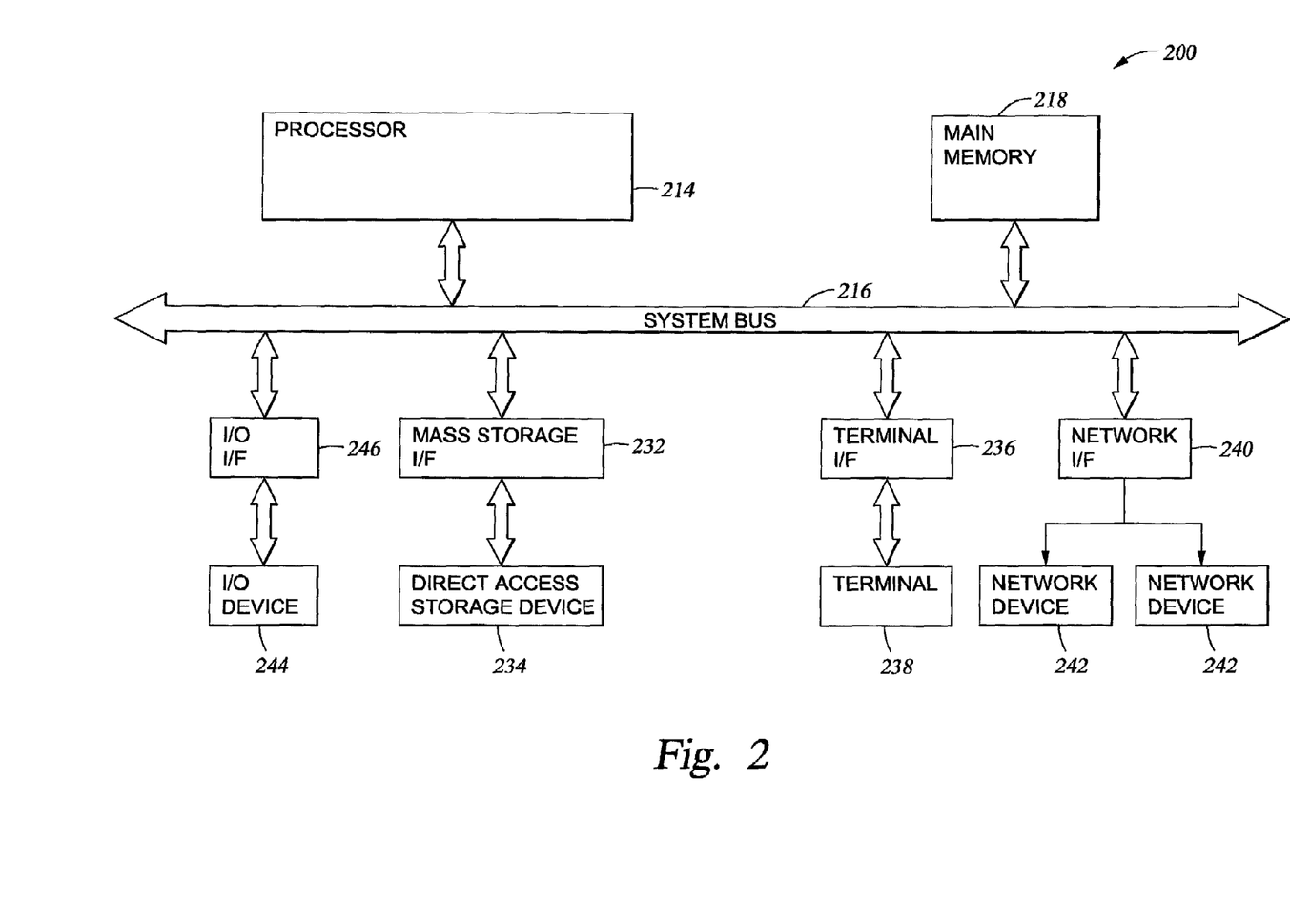
FIG. 2 is a high-level diagram of a computer in which aspects of the invention may be implemented.

FIG. 2 depicts a computer 200 in which embodiments of the invention may be implemented. The computer may be representative of computers used to execute software necessary to implement the software environment shown in FIG. 3, described below. FIG. 2 is merely one configuration for a computer. Embodiments of the present invention can apply to any comparable hardware configuration, regardless of whether the computer system is a client, a server, a complicated, multi-user computing apparatus, a single-user workstation, or network appliance that does not have non-volatile storage of its own.

In general, the computer 200 includes a Central Processing Unit (CPU) 228 connected via a bus 230 to a memory 232, storage 234, input device 236, output device 238 and a network interface device 237. The input device 236 can be any device to give input to the computer 200. For example, a keyboard, keypad, light-pen, touch-screen, track-ball, or speech recognition unit, audio/video player, and the like could be used. The output device 238 is preferably any conventional display screen and, although shown separately from the input device 236, the output device 238 and input device 236 could be combined. For example, a display screen with an integrated touch-screen, and a display with an integrated keyboard, or a speech recognition unit combined with a text speech converter could be used.

The network interface device 237 may be any entry/exit device configured to allow network communications between the computer 200 and other networked devices via the network (shown in FIG. 1), for example. For example, the network interface device 237 may be a network adapter or other network interface card (NIC).

Memory 232 is preferably random access memory sufficiently large to hold the necessary programming and data structures of the embodiments of the invention. While memory 232 is shown as a single entity, it should be understood that memory 232 may in fact comprise a plurality of modules, and that memory 232 may exist at multiple levels, from high speed registers and caches to lower speed but larger DRAM chips.

Storage 234 is preferably a Direct Access Storage Device (DASD), although it is shown as a single unit, it could be a combination of fixed and/or removable storage devices, such as fixed disc drives, floppy disc drives, tape drives, removable memory cards, or optical storage. Memory 232 and storage 234 could be part of one virtual address space spanning multiple primary and secondary storage devices.

Figure 3:
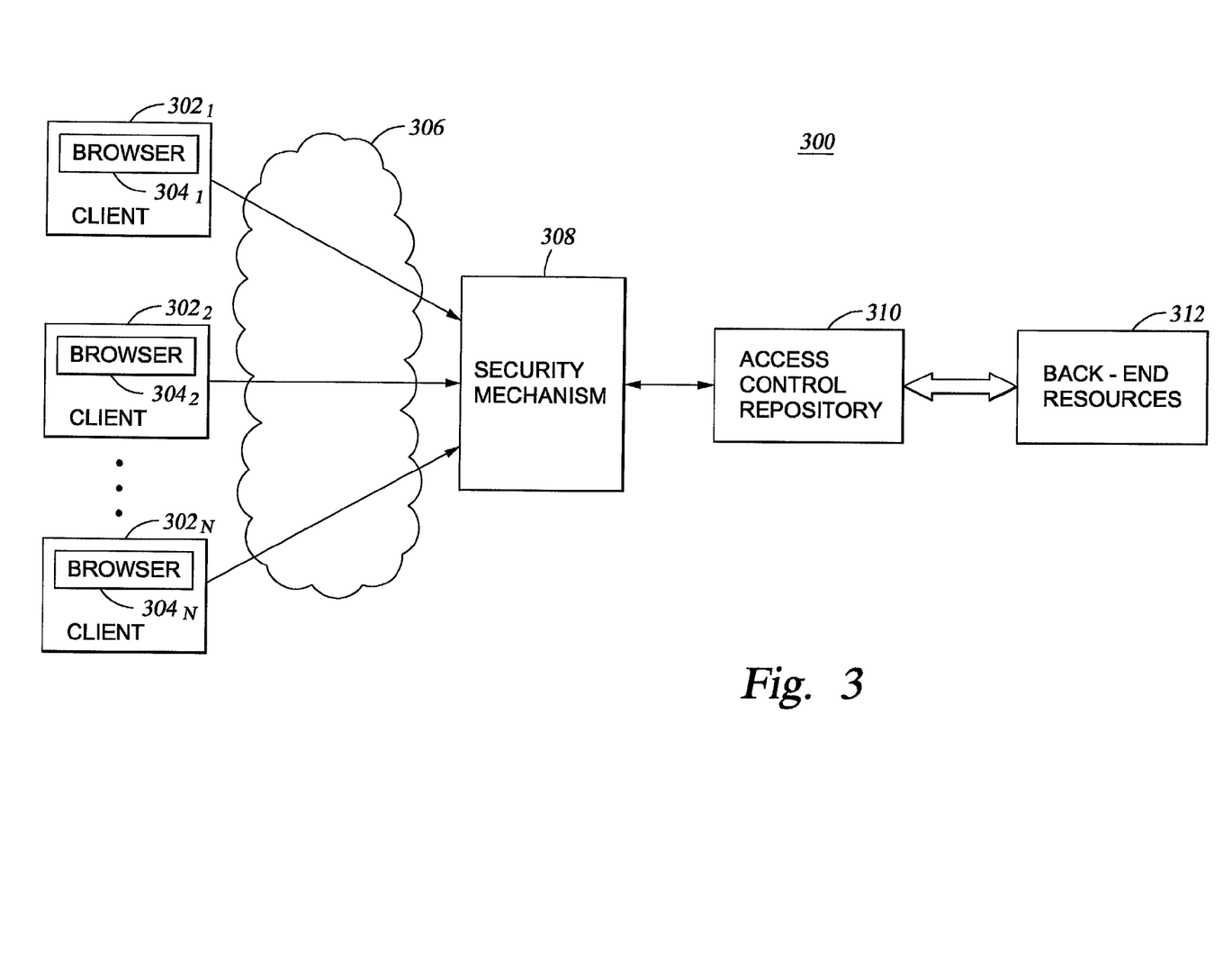
FIG. 3 is a distributed environment configured with an access control repository.

FIG. 3 is a distributed environment 300 configured with an access control repository. Some or all of the devices of the distributed environment 300 may be computers such as the one described above with reference to FIG. 2. In general, the distributed environment 300 shows a front-end tier, back-end tier and an intermediate tier. The front-end is defined by a plurality of client computers $302_1$, $302_2$ . . . $302_N$ (collectively referred to herein as clients 302) operated by users desiring to access entitlement services data. In a Web-based environment each of the clients 302 execute a browser application $304_1$, $304_2$ . . . $304_N$ (collectively referred to herein as browsers 304). Illustrative browsers including Netscape's Navigator® and Microsoft's Internet Explorer®. Although aspects of the invention are described in the context of a Web environment, the invention contemplates any distributed environment. Accordingly, the particular client application used by the clients 302 will depend upon the resources being accessed.

The browsers 304 are configured to access the intermediate tier via a network 306. The network 306 may be any Local Area Network (LAN), Wide Area Network (WAN) or combination thereof. In a particular embodiment, the network 306 is the Internet. In one embodiment, information flow between the network 306 and the intermediate tier is restricted by a security mechanism 308. The security mechanism 308 may be, for example, a firewall which may be implemented as software, hardware or both.

Illustratively, the intermediate tier comprises an Access Control Repository (ACR) 310. The term Access Control Repository (ACR), like all terms used herein, is merely used for convenience and is not intended to restrict the scope of the invention to a particular implementation. The ACR 310 is generally any repository containing entitlement services data. The entitlement services data contained in the ACR 310 is not specific to any particular application or interface, but rather includes (at least in one embodiment) records representing all the entitlements for a given customer of a given enterprise (e.g., corporation). The source of the entitlement services data is the back-end resources 312. Thus, the ACR 310 is populated with entitlement services data from the back-end resources 312, which generally comprises a plurality of databases each containing different entitlement services data.

It should be noted that the ACR 310 and the back-end resources 312 may be, but need not be, part of a common enterprise. For example, the ACR 310 and the back-end resources 312 may both be maintained by International Business Machines, Inc. Alternatively, the ACR 310 and the back-end resources 312 may be separately maintained. For example, the back-end resources 312 may be maintained by International Business Machines, Inc., while the ACR 310 may be maintained by an independent third party. In the latter embodiment, the ACR 310 may contain entitlement services data for a plurality of enterprises. In this way, customers can enjoy a single access point to all their entitlement services data.

Figure 4:
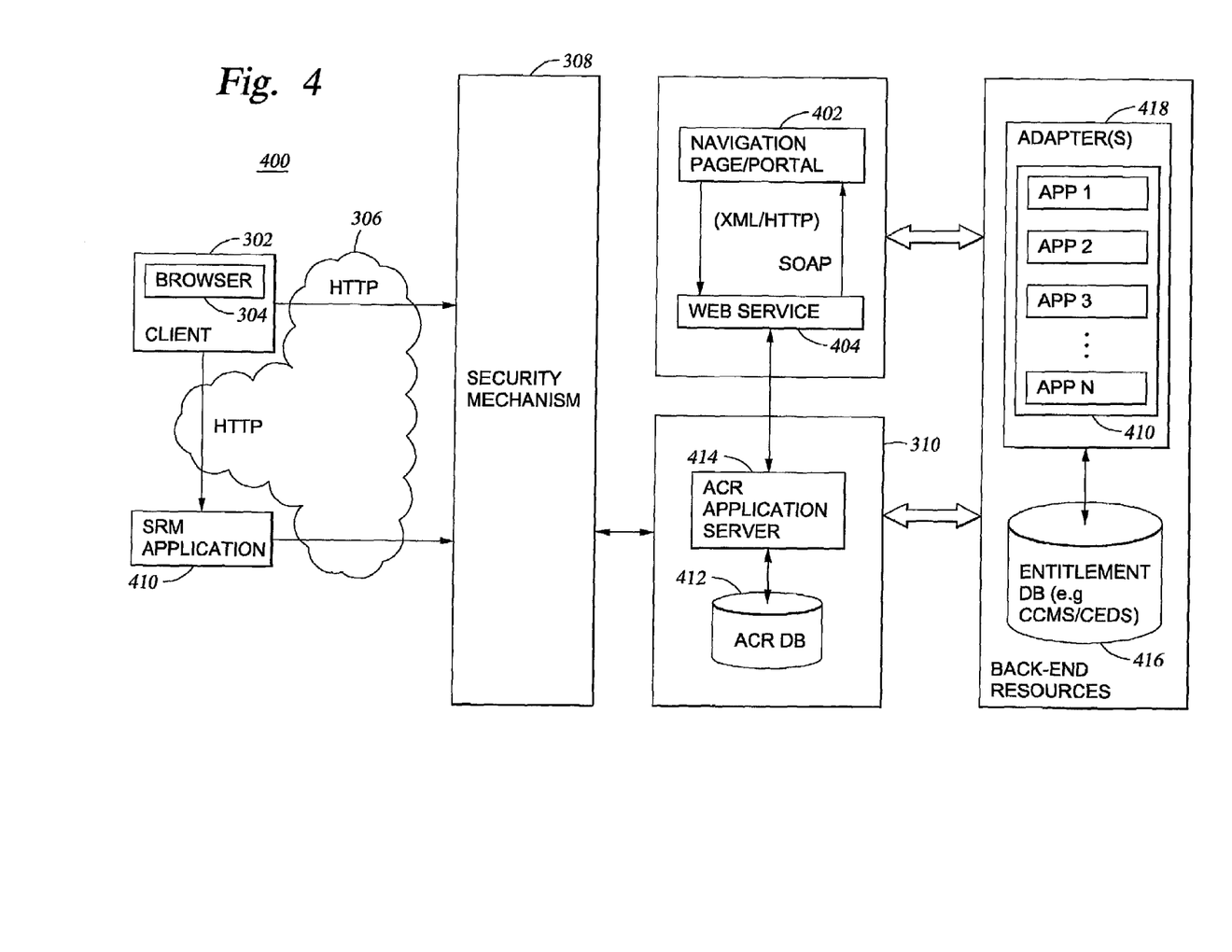
FIG. 4 is a distributed environment configured with an access control repository and may considered one embodiment of FIG. 3.

Referring now to FIG. 4, a distributed environment 400 is shown which may be considered a detailed embodiment of the distributed environment 300 shown in FIG. 3. As such, like numerals denote like components described above. For simplicity, only a single client computer 302 is shown. A navigation page/portal 402 provides an entry point to a plurality of entitlement services (as well as other services) offered by an enterprise. Access to the entitlement services is supported by a Web service 404 which, illustratively, supports any of a variety of communication protocols including XML, HTTP and SOAP. Each of the entitlement services is supported by one or more applications 410. Each application 410 is configured with an Application Program Interface which allows the respective application 410 to make requests for data contained in an ACR database 412 of the ACR 310. In order to handle requests from the applications 410, the ACR 310 is configured with an ACR application server 414 which, in response to a request, accesses the ACR database 412 and returns the appropriate information. In one embodiment, the ACR application server 414 is a Websphere server and the ACR database 412 is a DB2 database, both of which are products available from International Business Machines, Inc.

The ACR database 412 is populated with information from a plurality of entitlement databases 416. Illustrative records contained in the ACR database 412 will be described below. Connectivity between the ACR database 412 and the entitlement databases 416 is facilitated via one or more adapters 418.

Figure 5:
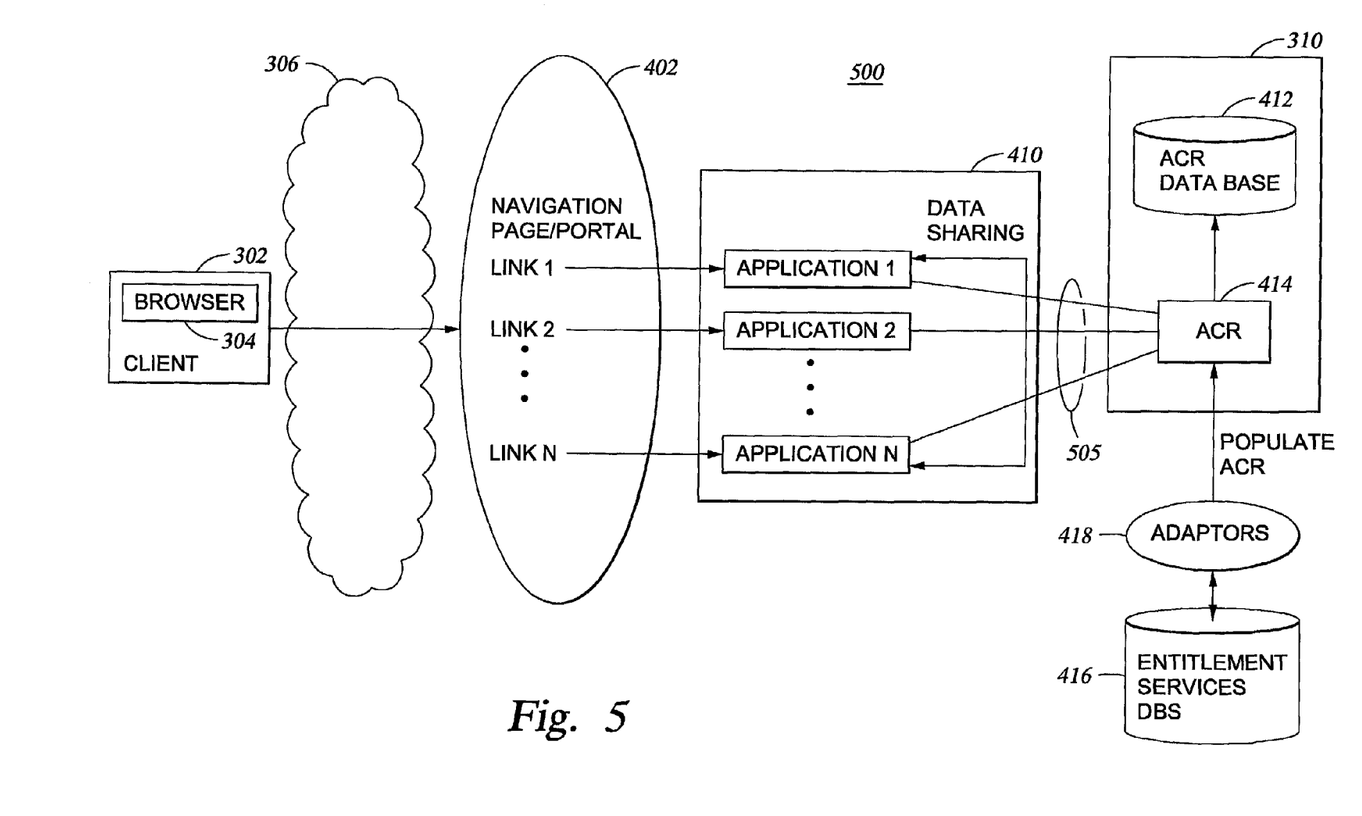
FIG. 5 is an illustrative embodiment of a software context implemented in the distributed environment of FIG. 3.
Figure 6:
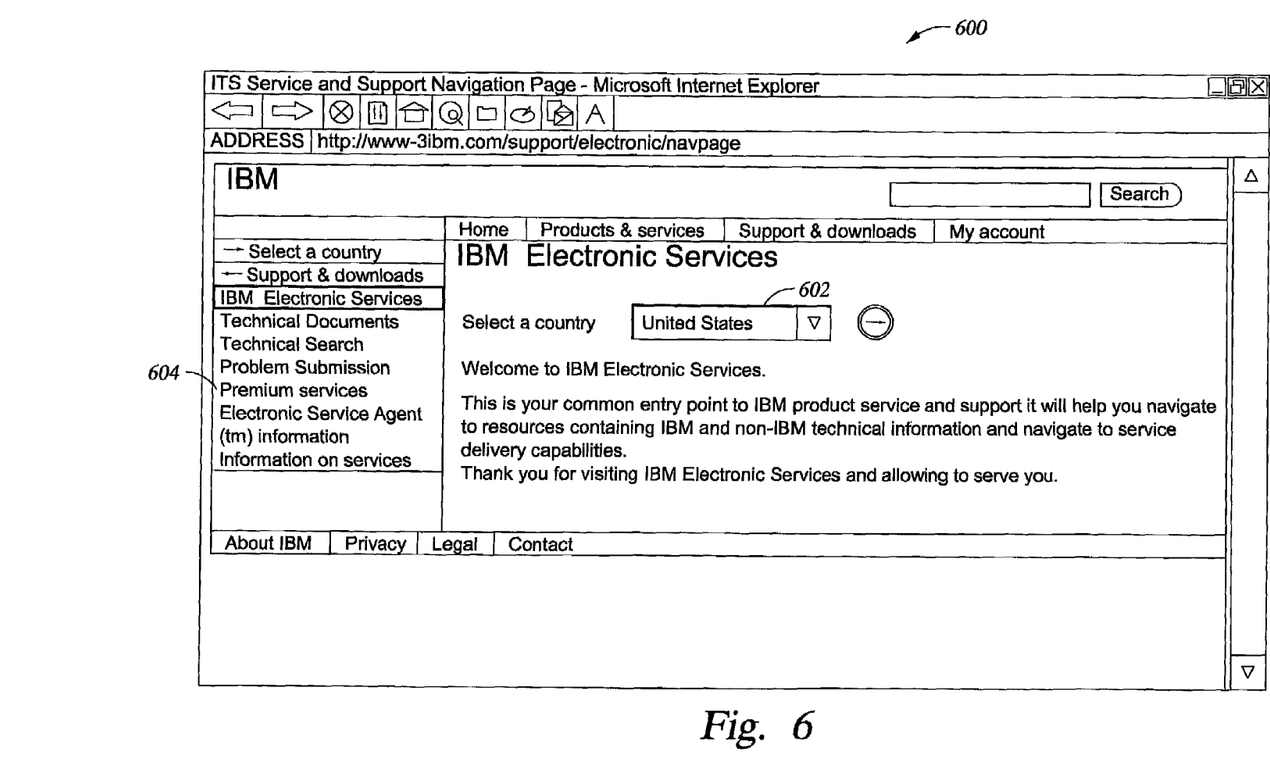
FIGS. 6–9 are graphical user interfaces illustrating a browsing session in which a user accesses entitlement services.
Figure 7:
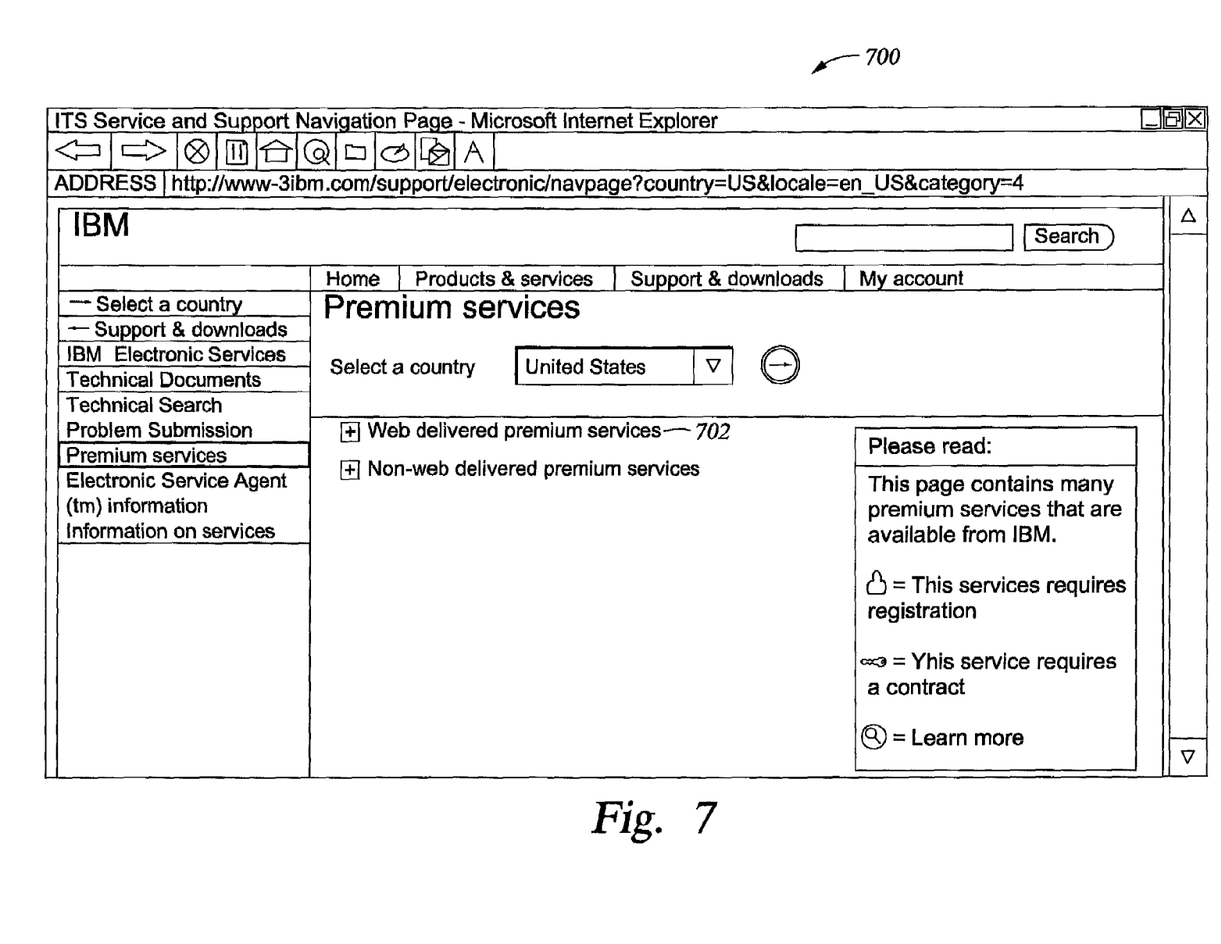
Figure 8:
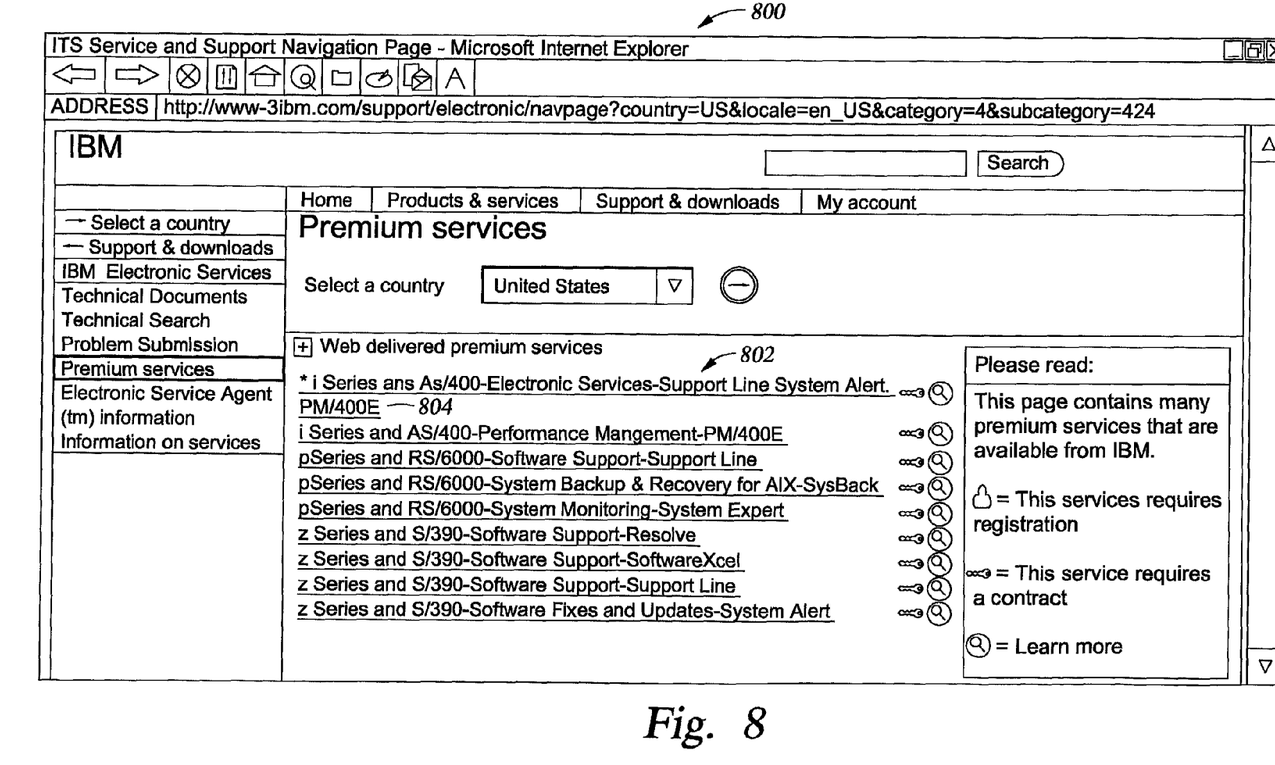
Figure 9:
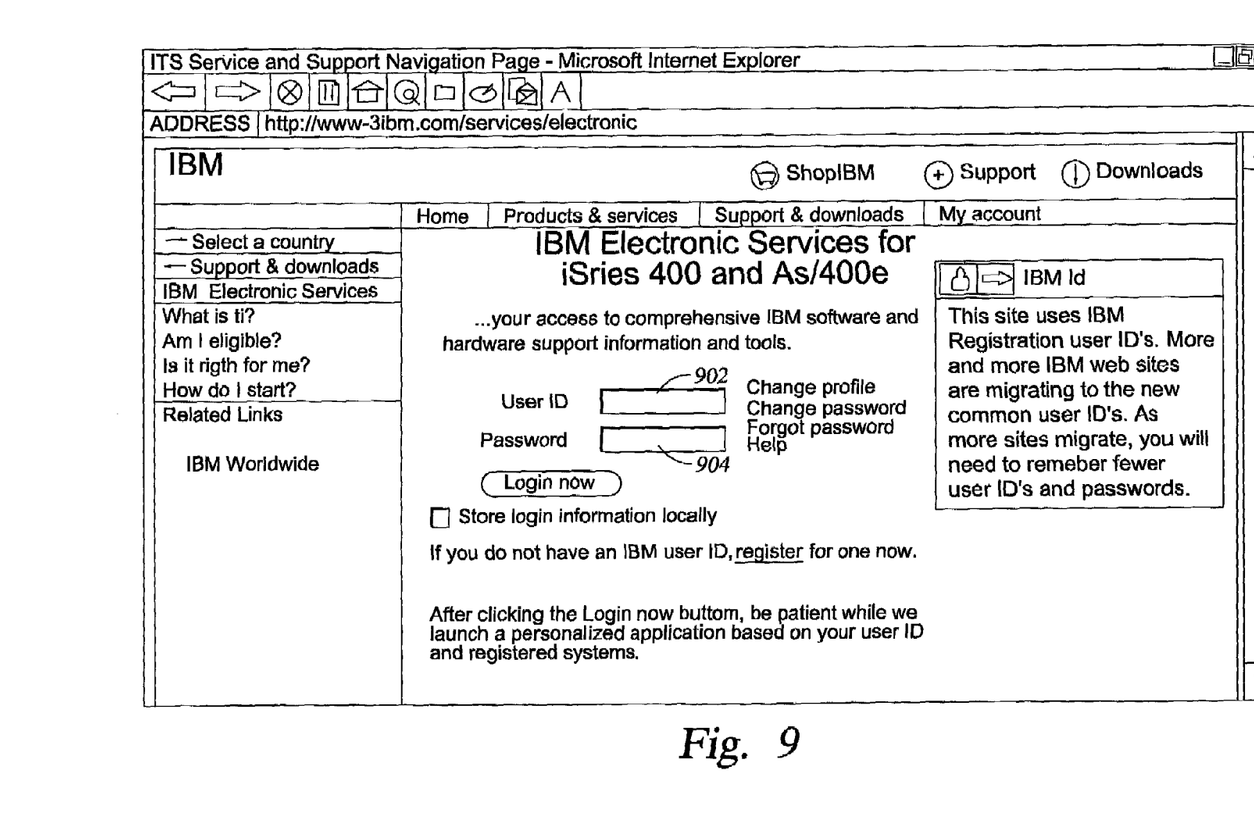

The processing implemented by the distributed environments 300, 400 is further described with reference to the data processing environment 500 of FIG. 5. In addition, reference is made to FIGS. 6–10 which show examples of user interfaces encountered during a browser session. Again, like numerals identify components introduced above. During a browser session, a user accesses information about their entitlement services by first accessing the navigation portal 402 via a browser 304. An example of a navigation portal is illustrated by the graphical user interface (GUI) 600 in FIG. 6. The GUI 600 provides a country field 602 (implemented as a drop-down menu) in which a user may designate a country. The GUI 600 also provides a plurality of hyperlinks, each of which allow the user to access different services. For purposes of illustration, it is assumed that the user clicks on the "Premium services" link 604. As a result, the browser 304 navigates to a premium services page illustrated by the GUI 700 in FIG. 7. Here, it is assumed that the user clicks on a "Web delivered premium services" link 702 causing the browser 304 to navigate to the premium services page illustrated by the GUI 800 in FIG. 8. The GUI 800 provides a plurality of links 802 for different products having Web based services. Each of the links 802 may be associated with one of the applications 410. As a result, the user invokes an application 410 by clicking on any of the application's respective links. By way of illustration, it is assumed that the user clicks on a first link 804 which provides services for the iSeries and AS/400 computers. Clicking on the first link 804 causes the browser 304 to navigate to the GUI 900 shown in FIG. 9. The GUI 900 provides a sign-in interface comprising a user ID field 902 and a password field 904. Successfully signing in requires the user to first have registered. Once registered, the user can enter the appropriate information into each of the fields 902, 904 and access the services for the designated products. In particular, the user may invoke the appropriate application 410 to access entitlement services data contained in the ACR database 412.

Referring back to FIG. 5, retrieval of entitlement services data contained in the ACR database 412 is initiated when the user issues a request (e.g., by clicking on a link or submitting sign-in information) from the browser 304 via the network 306. An application 410 invoked by the request then issues a query 505 to the ACR application server 414 to determine whether the user is entitled. A response to the query is generated by the application server 414 by accessing the database 412 to determine whether any records exist for the request to user. Any relevant records are then return to the requesting application 410.

In this manner, each request for entitlement services data is handled by the ACR 310 regardless of the application 410 being invoked. In addition, each of the applications 410 may share data between one another. At one level, data sharing occurs because the applications 410 have access to a common repository: the ACR database 412. However, in a particular embodiment, the applications directly pass entitlement services information between one another. For example, when a user accesses a service supported by Application 1, Application 1 operates to retrieve entitlement data for the user from the ACR database 412. When a user then accesses services supported by Application 2, the entitlement data retrieved by Application 1 is passed to Application 2. Accordingly, Application 2 need not issue a request to the ACR server 414, which is a relatively expensive operation. In this manner, one aspect of the invention achieves greater performance than is available with prior art entitlement systems.

In another aspect, consolidation of entitlement services data allows an enterprise to offer services not possible with prior art entitlement systems. For example, as described above, where the entitlement services data is distributed over a plurality of databases, no feasible solution for extending complementary services to customers of an enterprise. Embodiments of the present invention overcome the limitations of the prior art by consolidating the entitlement services data into a common repository. Each application, regardless of the specific services which it supports, now has access to all services to which a customer is entitled.

As noted above, the ACR database 412 is populated with information from the entitlement services databases 416. In one embodiment, the population of the database 412 is managed by the adapters 418. Population of the database 412 may be performed, for example, when a user enters through the navigation page 402 and registers a product through a particular application 410. The application interface then notifies the appropriate adapter 418 to replicate data contained in the entitlement services databases 416 to the ACR database 412.

Figure 10:
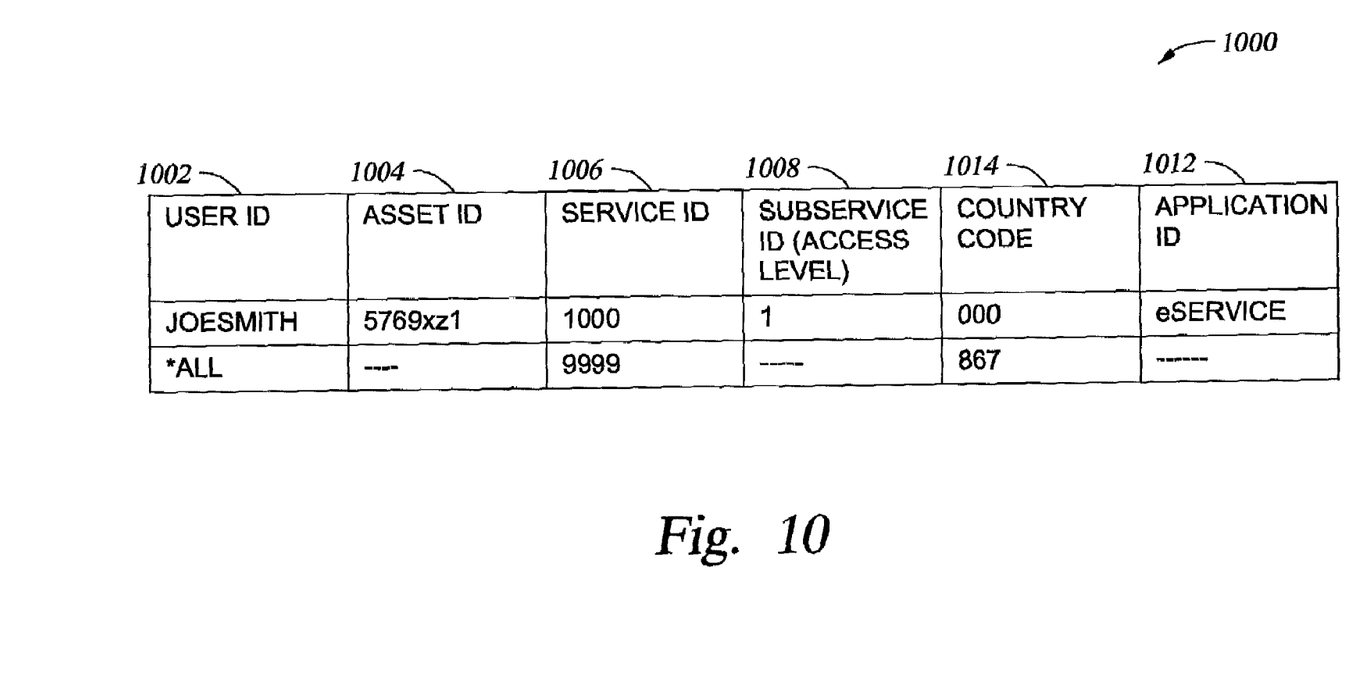
FIG. 10 is an illustrative table maintained with data located in the access control repository.

Referring now to FIG. 10, an illustrative ACR table 1000 is shown. The table 1000 is representative of a table contained in the ACR database 412. In general, the table 1000 is formatted as a plurality of columns and rows, were each row defines a record. Illustratively, the table 1000 includes a user ID column 1002, an asset ID 1004, a service ID 1006, a subservice ID 1008, a country code 1014, and an application ID 1012. The user ID may be any combination of alphanumeric characters which a user provides at the time of registration. The asset ID uniquely identifies the particular product to which entitlement services attached. The service ID and subservice ID represent the services to which the user is entitled (e.g., problem management, performance management, etc.) as defined by the applications 410. The country code specifies a country specific to the product and entitlement services. The application ID specifies participating applications for authentication of the applications. In this manner, the application ID prevents unauthorized applications (e.g., such as an application created by a hacker) from accessing the database 412. For a given user, a separate record exists for each combination of assets, services, country and application.

It should be understood that the table 1000 is merely illustrative. Persons skilled in the art will recognize that the table 1000 may be formatted to contain additional (or in some cases less) information.

While the foregoing is directed to embodiments of the present invention, other and further embodiments of the invention may be devised without departing from the basic scope thereof, and the scope thereof is determined by the claims that follow.

What is claimed is:

1. A method of providing entitlement services information to users, comprising:
   receiving a request for entitlement services information for a particular user, wherein the entitlement services comprise one of maintenance agreements and service agreements;
   in response to receiving the request:
      accessing a common entitlement services information repository; wherein the common entitlement services information repository associates entitlement services with products to which the entitlement services attach and with users of the products; wherein each of at least a portion of the plurality of users is associated with at least two products; and
      providing a first application with entitlement services information for the particular user, wherein the first application corresponds to a first entitlement service;
   passing at least a portion of the entitlement services information for the particular user from the first application to a second application, wherein the second application corresponds to a second entitlement service, and wherein the second application does not support the first entitlement service; and
   transmitting a response containing the portion of the entitlement services information from the second application to the particular user.

2. The method of claim 1, wherein the common entitlement services information repository associates a combination of an entitlement service, a product and a user with a geographic region.

3. The method of claim 1, wherein the at least two products comprise at least one hardware product and at least one software product.

4. The method of claim 1, wherein the request is issued by a Web based application.

5. The method of claim 1, wherein the request is issued by the first application invoked by the particular user browsing a Web site.

6. The method of claim 1, wherein the first application is configured to provide support for only a portion of a plurality of entitlement services represented in the common entitlement services information repository.

7. The method of claim 1, further comprising populating the common entitlement services information repository with entitlement services data contained in a plurality of entitlement services databases each of which are specific to a particular product.

8. The method of claim 7, wherein populating comprises associating a combination of an entitlement service, a product and a user with a geographic region.

9. The method of claim 1, wherein the first entitlement service attaches to a first product and wherein the second entitlement service attaches to a second product.

10. The method of claim 1, wherein the first entitlement service and the second entitlement service attach to a same product.

11. An entitlement services system, comprising:
   a common entitlement services information system comprising a repository associating entitlement services with products to which the entitlement services attach and with users of the products; wherein each of at least a portion of the plurality of users is associated with at least two products, wherein the entitlement services comprise one of maintenance agreements and service agreements; and at least one server hosting a plurality of applications each configured to issue requests to the common entitlement services information system for entitlement services information and each configured to pass entitlement services information between one another wherein a first one of the plurality of applications corresponding to a first entitlement service passes at least a portion of the entitlement services information to a second one of the plurality of applications corresponding to a second entitlement service, wherein the second one of the plurality of applications does not support the first entitlement service, and wherein the second one of the plurality of applications is configured to transmit a response containing the portion of the entitlement services information to one of the plurality of users.

12. The system of claim 11, wherein the repository associates a combination of an entitlement service, a product and a user with a geographic region.

13. The system of claim 11, wherein the at least two products comprise at least one hardware product and at least one software product.

14. The system of claim 11, wherein each of the plurality of applications is configured to provide support for only a portion of a plurality of entitlement services represented in the repository.

15. The system of claim 14, further comprising a web server hosting a Web service providing an interface to each of the plurality of applications.

16. The system of claim 14, wherein the plurality of applications are invoked by browser requests.

17. The system of claim 11, further comprising a plurality of entitlement services databases from which entitlement services information is replicated to the common entitlement services information repository.

18. The system of claim 17, wherein each of the plurality of entitlement services databases is specific to a particular product.

19. The system of claim 17, wherein each of the plurality of entitlement services databases is specific to a particular geographic region.

20. An entitlement services system, comprising:
(a) a common entitlement services information system, comprising:
  a repository associating entitlement services with products to which the entitlement services attach and with users of the products; wherein each of at least a portion of the plurality of users is associated with at least two products, wherein the entitlement services comprise one of maintenance agreements and service agreements; and
  an access control software component configured to access the repository in response to entitlement services information requests;
(b) at least one server executing a plurality of Web based applications configured to issue the entitlement services information requests, wherein each of the plurality of applications is configured to pass entitlement services information between one another, wherein a first one of the plurality of applications corresponding to a first entitlement service passes a portion of the entitlement services information to a second one of the plurality of applications corresponding to a second entitlement service, wherein the second one of the plurality of applications does not support the first service, and wherein the second one of the plurality of applications is configured to transmit a response containing the portion of the entitlement services information to one of the plurality of users;
(c) a web server hosting a Web service providing an interface to each of the plurality of applications; and
(d) a plurality of entitlement services databases from which entitlement services information is replicated to the common entitlement services information repository.

21. The system of claim 20, wherein each of the plurality of applications is configured to provide support for only a portion of a plurality of entitlement services represented in the repository.

22. The system of claim 20, wherein the plurality of applications are invoked by browser requests.

23. The system of claim 20, wherein the repository associates a combination of an entitlement service, a product and a user with a geographic region.

24. The system of claim 20, wherein the at least two products comprise at least one hardware product and at least one software product.

25. The system of claim 20, wherein entitlement services information is replicated to the common entitlement services information repository from the plurality of entitlement services databases via a plurality of adaptors.

26. The system of claim 20, wherein each of the plurality of entitlement services databases is specific to a particular product.

27. The system of claim 20, wherein each of the plurality of entitlement services databases is specific to a particular geographic region.

28. The system of claim 20, wherein the first entitlement service attaches to a first product and wherein the second entitlement service attaches to a second product.

29. The system of claim 20, wherein the first entitlement service and the second entitlement service attach to a same product.

* * * * *